United States Patent

Morroni

[15] 3,660,002
[45] May 2, 1972

[54] APPARATUS FOR MOLDING OPEN CONTAINERS

[72] Inventor: Peter J. Morroni, c/o Clearshield Plastic Co., Florence Street, Leominster, Mass. 01453

[22] Filed: Sept. 25, 1969

[21] Appl. No.: 861,083

[52] U.S. Cl.................................425/405, 425/249, 425/414, 425/422, 425/437
[51] Int. Cl. ........................................B29f 1/14, B29c 7/00
[58] Field of Search...................18/2 RA, 2 RP, 2 RC, 2 RM, 18/42 D, 42 M, 19 F; 249/66, 63, 67, 68

[56] References Cited

UNITED STATES PATENTS

| | | | |
|---|---|---|---|
| 2,339,792 | 1/1944 | Milano | 18/42 D |
| 2,959,818 | 11/1960 | Diehl et al. | 18/42 R |
| 2,981,976 | 5/1961 | Maier | 18/42 R |
| 3,004,288 | 10/1961 | Gardner | 18/2 RC UX |
| 3,060,509 | 10/1962 | McCubbins | 18/2 RP X |
| 3,341,893 | 9/1967 | Edwards | 18/19 F |
| 3,338,997 | 8/1967 | Tigner | 18/19 F X |
| 3,389,434 | 6/1968 | Cleereman et al. | 18/42 D |
| 3,473,197 | 10/1969 | Wilds et al. | 18/42 D |
| 3,534,443 | 10/1970 | Tucker | 18/42 D |
| 3,289,252 | 12/1966 | Bromley | 249/63 X |
| 3,341,897 | 9/1967 | Susuki et al. | 249/63 X |

FOREIGN PATENTS OR APPLICATIONS

| 1,145,783 | 3/1963 | Germany | 18/2 RC |
|---|---|---|---|

*Primary Examiner*—J. Howard Flint, Jr.
*Attorney*—Charles R. Fay

[57] ABSTRACT

In the ejection of molded open-top containers from a plastic injection molding die, that improvement which comprises holding the just molded container in the cavity as the mold opens and blowing air onto the exterior of the bottom of the molded container in a direction to force the container out of the cavity.

4 Claims, 5 Drawing Figures

PATENTED MAY 2 1972 3,660,002
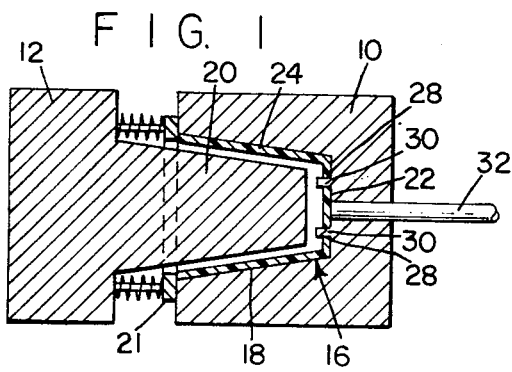
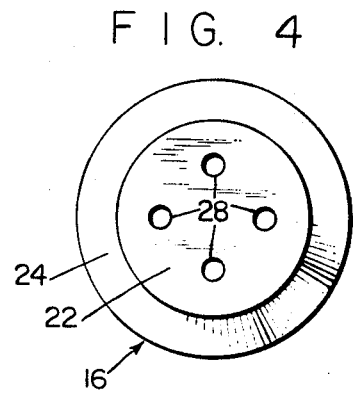
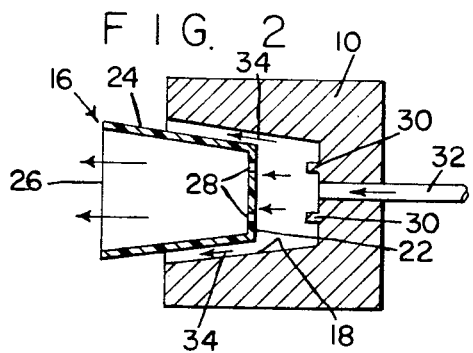
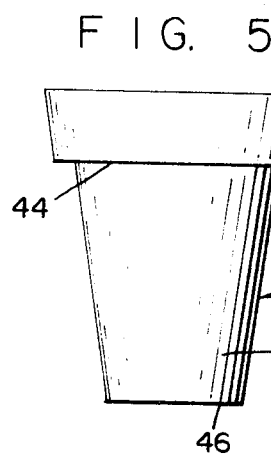
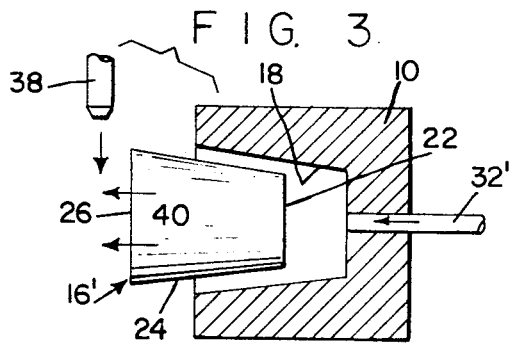
INVENTOR
PETER J. MORRONI
BY Charles P. Day
ATTORNEY

APPARATUS FOR MOLDING OPEN CONTAINERS

BACKGROUND OF THE INVENTION

The injection molding of open-top containers for instance flower pots, has always been made using thermoplastic material os substantially stiff characteristics, e.g. Styrene. Such containers are frangible. When such containers are molded, they tend to remain on the core half of the mold, i.e., the male part of the mold, and the molded article is stripped from the core with a rigid stripper plate. This plate comprises a square member having an opening therein slightly smaller than the open edge of the container, said stripper plate automatically moving relative to the core as the die parts open so that the relatively stiff container is moved or stripped from the core without damaging it.

However, when it is attempted to mold similar containers of a low density of flexible plastic material, the stripper plate causes collapse of the walls of the first container, resulting in a product which is of course unacceptable. This is due to the nature of the softer plastic material which is crushed during the process of stripping when attempted to be accomplished in the manner described for stiffer articles.

SUMMARY OF THE INVENTION

In this invention, the containers of the softer material are held just after molding, to remain in the front part of the mold, i.e., the female part which has a cavity, and this is accomplished by a similar stripper plate which remains fixed in position a short interval of time as the die parts open so as to insure that the containers merely remain in position in the cavity. This holding action does not damage the containers because the cavity walls support the article during this action.

Air is then introduced in a blast at the bottom of the container, forcing the same out of the female cavity, i.e., out of the front half of the mold, the stripper plate by now being removed enough to let the article eject.

Where, however, the molded article is in the form of a hollow truncated cone having a solid or continuous bottom, and an open top, the stream of air impinging on the bottom of the container only dislodges the article slightly, and it snaps back into the cavity, and is not ejected. This is probably due to an aerodynamic effect, the air reversing and rushing into the open end of the container, causing the container to in effect reciprocate and therefore stay in the cavity.

This deficiency has been overcome by disrupting the blast of air as it enters the molded container at the open end thereof, in either of two ways. By forming holes in the bottom of the container, the air in addition to impinging on the bottom, rushes through the container itself and out through the open end thereof. This air counteracts the air which tends to enter at the open end of the container, thus allowing the container to be ejected by the air on the container bottom and allowing for rapid automatic ejection and actuation of the injection molding machine.

Another way of accomplishing the same object is to provide a second blast of air directed at right angles to the open end of the container, to in effect disturb and disrupt the air advancing into the container from its open end, and which causes the container to remain in the mold, so that the air then does not have the effect of holding the container in the mold, so that it is easily ejected, even without any holes in the bottom of the container.

BRIEF DESCRIPTION OF THE DRAWINGS

FIG. 1 is a diagrammatic sectional representation illustrating a container as molded and held in position in the cavity of the front part of the die by a stripper plate, while the rear part of the die having the core starts to separate;

FIG. 2 is a similar view of the front part of the die illustrating the action of the jet of air on the open top container to eject it from the die part;

FIG. 3 illustrates diagrammatically a modification showing the streams of air to dislodge an open container having a solid bottom;

FIG. 4 is a bottom plan view of a plastic flower-pot which is manufactured by the use of the present invention, and FIG. 5 is a view in elevation of a different kind of container.

PREFERRED EMBODIMENT OF THE INVENTION

Referring now to FIG. 1, the reference numeral 10 indicates the front half of the two-part mold. The reference numeral 12 shows the position of the rear half of the mold after the open-top container 16 has been molded, and the mold parts start to open. The front pat of the mold has in this case a female cavity 18 and the rear half 12 has a male core, the latter being indicated at 20.

The injection molding is done in the usual manner but in this case the male portion of the mold, i.e., the rear half, is provided with a spring-pressed stripper plate 21 which remains in the position shown in FIG. 1 until the core is removed from the interior of the container, i.e., as shown in FIG. 1. As the rear half of the mold 12 proceeds relatively speaking to the left, the core 20 of course becomes fully disengaged with respect to the front part of the mold and the stripper plate 21 is then carried with the rear half to a remote position to allow the container 16 to be ejected.

It will be noted that this container is in the nature of a truncated cone and has a circular bottom 22 and a conical side wall 24, and an open top at 26.

In the case of FIGS. 1, 2 and 4, the container bottom 22 is provided with openings 28. As a matter of fact, the article being molded is a flower-pot, but of course the invention is applicable to other objects of like nature as well.

The mold is provided with short pins at 30 which occasion holes 28 and after the mold half 12 has receded to a sufficient degree, a blast of air is automatically applied through a conduit 32 into the mold at the bottom of the molded container. This tends to dislodge the molded container and as it separates very slightly from the side walls of the female cavity as indicated in FIG. 2, a part of the air from the source 32 flows through the holes 28 into the interior of the container and out to the open end thereof.

This action disrupts any tendency of the air being forced between the walls of the cavity and the exterior surface of the wall 24 of the container and which may tend to enter the container at the forward portion thereof to keep it seated in the mold. It has been found as a matter of fact that without the holes 28 the open top container will reach approximately the position shown in FIG. 2 and then be forced directly back into original position again. However the holes 28 provide air streams countering the aerodynamic effect of the air passing the side walls of the container as indicated by arrows 34 in FIG. 2, and the finished open top container 16 is ejected from the mold and the mold parts then once more close for the next shot.

In this way the operation of molding soft plastic containers is just as fast as the previous operation of molding high density relatively stiff containers and the action is fully automatic as in any injection molding machine.

It has also been found however that the effect of the blast of air indicated in FIG. 3 as at 32', is to tend to re-seat the container. This can be counteracted by another blast of air as for instance at 38, which disrupts the air flow at the open end of the container, see arrows 40, this allows the air at 32' to completely eject the open-ended container 16'. In the case of FIG. 3, the operation is found to be successful whether or not there are any holes in the bottom of the container, but in the case of FIGS. 1 and 2, where there is a single source of air pressure, the holes in the bottom of the container are found to be necessary.

There is another aspect of this invention, however. In FIGS. 1, 2 and 3, the containers are smooth sided with uninterrupted walls, but another form of open-ended container of well known shape is shown in FIG. 5 at 42, wherein an exterior shoulder 44 follows the contour of the container as in the old-fashioned clay flower pot. In this case, the bottom at 46 may be solid with no holes, but the blast of ejecting air, as at 32 or 32', impinging on bottom 46, is found to satisfactorily eject this type of pot because the air, i.e., as at 34, FIG. 2, which passes the wall 48 of pot 42, also impinges on shoulder 44 just enough to thrust the container out of its cavity.

I claim:

1. A two-part for the injection molding of open top containers of plastic material, comprising means forming a deep female cavity in one mold part, means forming an elongated male core on the other mold part cooperating with the female cavity for the molding of the open top containers, means separating the mold parts to remove the male core from the article, means on one of the mold parts temporarily holding the container seated in the female cavity during the initial portion of the mold part separation, means to retract said holding means from the container at a point during the separation of the core from the cavity, thereby leaving the molded container still wholly within the female cavity, a first gas nozzle means in the female cavity forming means, said nozzle means opening into the cavity for applying a gas stream under pressure against the outside of the bottom of the molded container to tend to eject it from the mold, open end first, upon retraction of said holding means, a second gas nozzle means directing a second stream of gas toward the open top of the container in conjunction with the operation of the first-named nozzle means whereby said second gas stream tends to disrupt the first gas stream in the area of the open top of the container, thereby allowing the gas stream from the first nozzle means to fully eject the container from the mold.

2. The two-part mold of claim 1 wherein the means temporarily holding the container seated in the female cavity is located on the male core part of the mold.

3. A two-part mold for the injection molding of open top containers of plastic material, comprising means forming a female cavity in one mold part and means forming a male core on the other mold part cooperating with the female cavity for the molding of the open top containers, means separating the mold parts, means on one of the mold parts temporarily holding the container seated in the cavity during the initial portion of the mold part separation, means to retract said holding means from the container at a point during the separation of the core from the cavity, thereby leaving the molded container still wholly within the female cavity, a nozzle means in the female cavity forming means applying gas under pressure against the outside of the bottom of the molded container to eject it from the mold, upon retraction of said holding means, means in the female cavity forming means forming holes through the bottom of the container, so that after the container has been removed from the hole forming means by the gas under pressure, a part of the gas passes through the holes into the interior of the container.

4. The two-part mold of claim 3 wherein the means temporarily holding the container seated in the female cavity is located on the male core part of the mold.

* * * * *